INVENTOR.
HAROLD Y. MINAS
BY C. Harvey Gold
HIS ATTORNEY

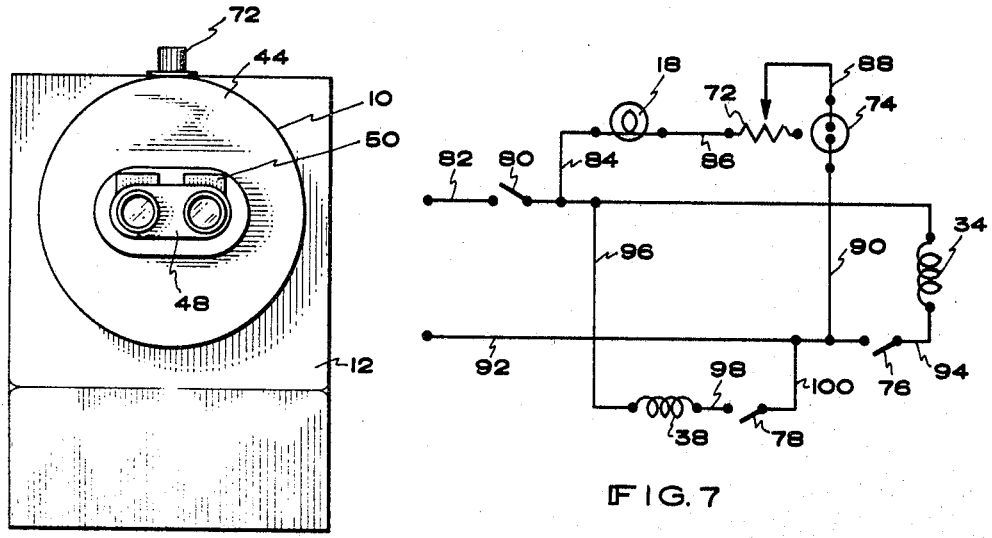
FIG. 4
FIG. 7
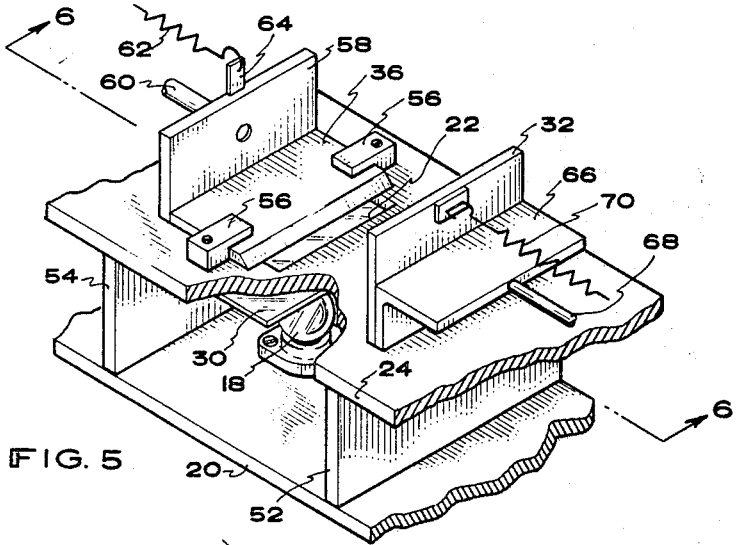
FIG. 5
FIG. 6
INVENTOR.
HAROLD Y. MINAS
BY 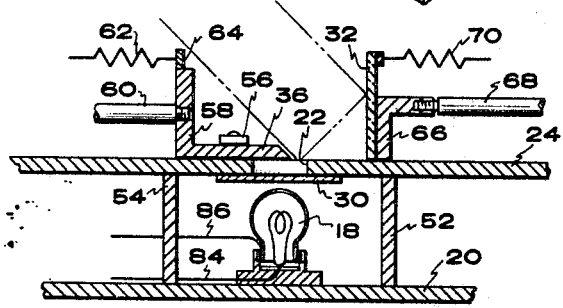
HIS ATTORNEY United States Patent Office 3,436,146
Patented Apr. 1, 1969

3,436,146
RETINAL IRRADIATION MEASURING DEVICE
Harold Y. Minas, 2201 23rd Ave.,
Sacramento, Calif. 95822
Continuation-in-part of applications Ser. No. 488,177,
Sept. 17, 1965, and Ser. No. 585,011, Oct. 7, 1966.
This application Nov. 29, 1966, Ser. No. 597,808
Int. Cl. A61b 3/06
U.S. Cl. 351—1                                9 Claims

ABSTRACT OF THE DISCLOSURE

A device for measuring retinal irradiation which includes a casing having an opening into which an individual may look, a variable intensity light source positioned in the casing behind a barrier with an indicium lighted by the light source and a reflecting mirror positioned in the casing between the barrier and the opening for providing a reflected image of the indicium which can be seen by an individual looking into the casing. The mirror can be adjustably mounted in the casing and a translucent plate can be positioned between the light source and the indicium in the barrier.

This is a continuation in part of my copending United States patent applications, Ser. No. 488,177, now abandoned, filed Sept. 17, 1965, and Ser. No. 585,011, filed Oct. 7, 1966.

This invention relates to a device for determining the tolerance of an individual's eyes to light, and in particular, to a device for determining the retinal irradiation observed by an individual in order to select tinted glasses having correct light transmitting characteristics suited to the individual.

It is established practice for ophthalmologists, optometrists, and opticians to prescribe the use of glasses having tinted or colored lenses. It is well known in the art of prescribing glasses of this type that some individuals require lenses having low light transmitting characteristics, whereas other individuals, which are subjected to similar light conditions, are best suited to lenses having high light transmitting characteristics. Heretofore, the selection of the tint of the absorptive lenses was based entirely upon a series of objective tests. Accordingly, it has been found that individuals are often dissatisfied with light absorptive spectacles, such as sunglasses, since the lenses thereof have light transmitting characteristics which are not suited to the eyes of the individual. In my copending United States patent application, Ser. No. 585,011, filed Oct. 7, 1966, a novel retinal irradiation method is described for providing an objective test to determine an individual's tolerance to light. This method is based upon my discovery that the extent of retinal irradiation observed by one person differs from that observed by another person viewing the same light source because of the difference in pupil size and state of retinal adaptation of the eyes of each individual. Since the pupil size and state of retinal adaptation of the eyes are the major factors which are considered in fitting an individual with tinted glasses, the retinal irradiation observed by an individual can be used in prescribing sunglasses and tinted prescription lenses. In my copending United States patent application, Ser. No. 488,177 filed Sept. 17, 1965, one type of apparatus is described for determining the retinal irradiation observed by an individual. This apparatus uses a testing slide having a plurality of indicium which cast a series of brightly illuminated indicium on a black background. A plurality of such slides are required to perform different tests. The intensity of the illuminated indicium as seen by the individual being tested is determined with a photoelectric cell which is positioned to measure the light cast upon the eyes of said individual. While this device has proven to be entirely suitable for testing the tolerance of an individual's eyes to light, it is not adapted to perform a variety of tests without replacing the testing slide. In addition, the mode of determining the intensity of the light actually observed by the individual may result in an inaccurate intensity reading, since light from sources other than the illuminated indicium may be included in the readout of the photoelectric cell.

Accordingly, it is an object of my invention to provide an apparatus for determining the tolerance of an individual's eyes to light which overcomes the defects and disadvantages heretofore found in such devices.

Another object of my invention is to provide a compact apparatus which may be utilized by ophthalmologists, optometrists, opticians or sales personnel vending prescription or nonprescription sunglasses and the like, to aid them in the selection of lenses having proper light transmitting characteristics.

Still another object of the instant invention is to provide a device of the character described which is compact in size, inexpensive to manufacture, easily maintained, and with operating procedures which are easily learned by technicians.

A further object of the instant invention is to provide a retinal irradiation measuring apparatus which has a variably controlled light source for subjecting the eyes of a patient to varying light intensities.

A further object of the instant invention is to provide an apparatus of the character described having light intensity measuring device therein to determine a patient's tolerance limits to light so that absorptive lenses, such as sunglasses, of suitable light transmitting characteristics, may be selected.

A still further object of my invention is to provide a device for determining an individual's tolerance to light, which device is adjustable to perform a plurality of tests without the necessity of using a series of testing slides.

Still other objects and attendant advantages of my invention will become apparent to those skilled in the art as the invention is better understood by reference to the detailed description appearing hereinafter.

The foregoing objects and attendant advantages may be achieved by providing a retinal irradiation measuring device which comprises a casing forming an opening into which an individual may look. A light source, having a substantially constant intensity for any predetermined voltage supplied thereto, is positioned within said casing behind a barrier having an indicium provided therein. Accordingly, when said light source is activated, the only light that can be seen by a person looking into the opening in said casing is that light which passes through said indicium. Reflecting means are also positioned within said casing so that an image of said illuminated indicium may be seen thereon by an individual looking into said casing. Said light source is provided with means for varying its intensity and is further provided with indicator means for determining said intensity. To determine the tolerance of an individual's eyes to light, the individual looks into the casing at the illuminated indicium and its image. The intensity of the light source is then increased until the indicium and the image appear to merge into one indicium. At this point the intensity of the light source is observed and equated to lens tint. In the preferred embodiment of my invention, the means for determining the intensity of the light source is a voltmeter.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

FIGURE 4 is a view of the casing and eyepiece of my apparatus as seen by an individual being tested with said apparatus.

FIGURE 5 is a partial perspective view of the preferred indicium producing means and indicium reflective means of my invention.

FIGURE 6 is a cross sectional view of FIGURE 4 taken along line 6—6 showing in detail the constant intensity light source and its relationship to one type of adjustable indicium slot and coacting adjustable reflective mirror.

FIGURE 7 is a schematic wiring diagram of one type of circuit which may be used to vary the intensity of the light source used in my device and to adjust the reflective surface and the indicium size.

It is well known that when the intensity of a source of light is increased the periphery of said source appears to increase when viewed by a person with unprotected or unshielded eyes. This phenomenon is known as retinal irradiation, or a change in contour size. As previously indicated, retinal irradiation may be used to prescribe tinted lenses or glasses. In so doing, an individual to be tested is shown a light source and the retinal irradiation observed by said individual is determined. This irradiation is then equated to tint or color by using an emperical conversion chart in which retinal irradiation is equated directly to lens tint. Said conversion chart may be obtained by running a series of retinal irradiation examinations on individuals having a known retinal adaption, i.e., on individuals which have been properly fitted with tinted lenses. The retinal irradiation observed by the tested individual is then equated to tint in their spectacles.

Figure 1:
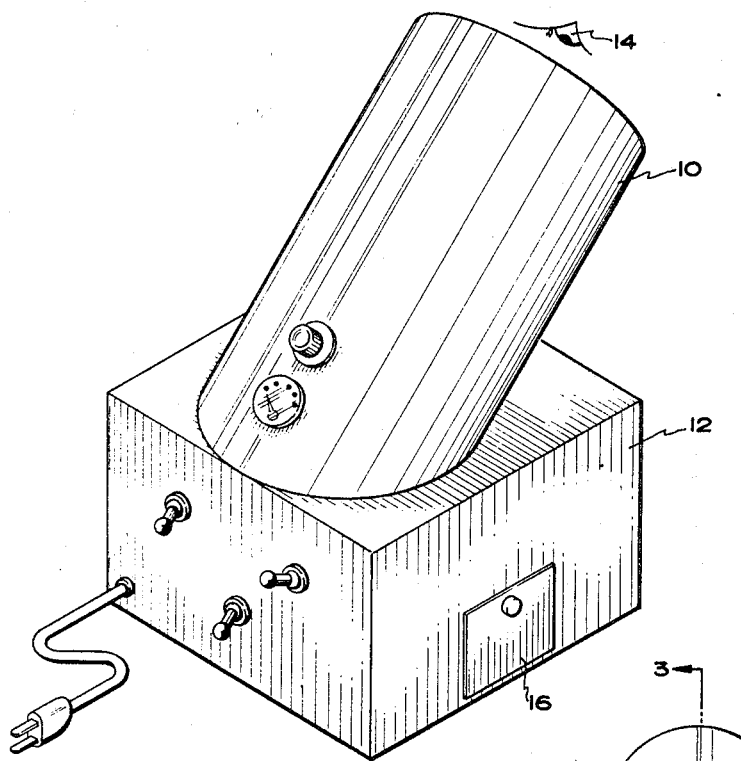
FIGURE 1 is a perspective view of my testing apparatus as seen by the examiner when testing the tolerance of an individual's eyes to light.
Figure 2:
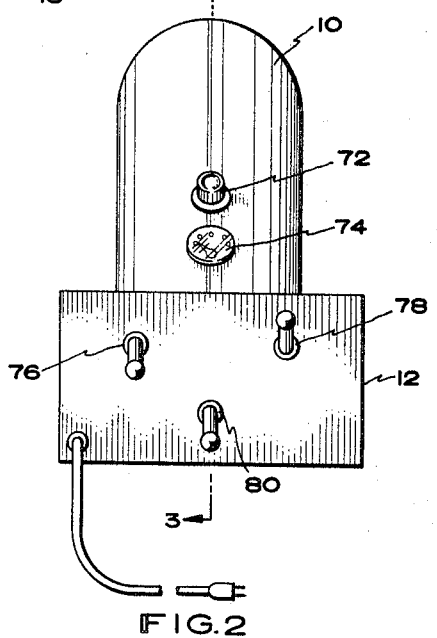
FIGURE 2 is a front view of my testing apparatus showing the controls for operating said apparatus.

Referring now more particularly to the drawings, FIGURE 1 is a perspective view of my testing device wherein casing 10 is shown supported upon base 12. Said casing 10 is preferably an elongated cylinder which angles upwardly away from base 12 in such a fashion so as to enable an individual, whose eyes 14 are being tested, to easily look into the interior of said casing 10. Base 12 accomplishes a dual purpose. Firstly, it solidly supports casing 10 in a predetermined fashion, and secondly, it houses the various components which are essential to the operation of my device. Base 12 is preferably a shell-like structure which may be easily dissembled to allow access to its interior portion. In addition, access panel 16 is preferably provided on one side of said base 12 which enables the operator of my device to easily change the light source, hereinafter described, which is secured within said base 12. FIGURE 2 shows the back view of my testing device. This view is the one conventionally observed by an examiner when testing the eyes of an individual. The control switches and test indicator are shown in detail in said FIGURE 2, each of which will be hereinafter described in detail.

Figure 3:
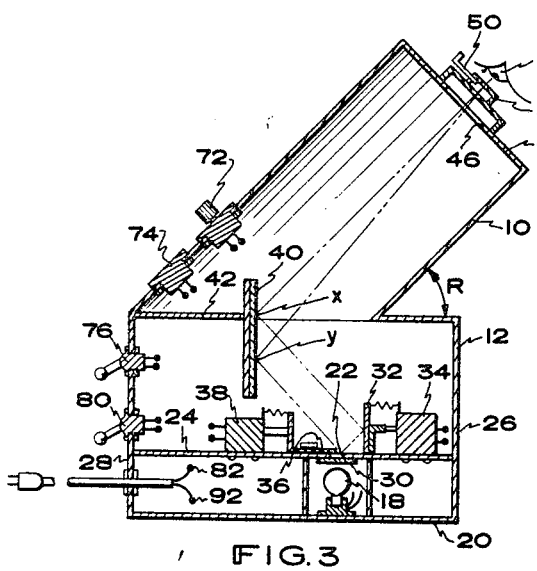
FIGURE 3 is a sectional view of FIGURE 2 taken along line 3—3, showing the internal construction of my testing apparatus.

FIGURE 3 is a sectional view of FIGURE 2 taken along line 3—3 which shows the internal construction of my testing device. As previously indicated, casing 10 is secured to base 12 and positioned at an upwardly extending angle therewith. This angle is designated as angle R which is about 0 to 90 degrees, and preferably 20 to 60 degrees. By positioning said casing 10 in this fashion, eyes 14 of an individual may be easily positioned to peer inwardly into the interior of said casing 10. Light source 18 is secured to bottom panel 20 of base 10. Said light source 18 is positioned to pass light through port 22 which is provided in intermediate plate 24. Said intermediate plate 24 is secured to front wall 26 and rear wall 28 of base 12 and is positioned so that it acts as a baffle, i.e., the interior of base 12 and casing 10 are maintained darkened so that the only light which can be seen by eyes 14 when said eyes are viewing the interior of said base 12 and casing 10 is the light which emanates outwardly through port 22. Translucent light diffusing member 30, such as a plate of frosted glass, is preferably positioned on the bottom of intermediate plate 24 to cover said port 22 and light source 18 in order to produce a uniformly distributed light indicium through said port 22. Reflecting means 32 such as a conventional substantially plane mirror is positioned on intermediate support 24 at an angle which is greater than zero degrees and less than 45 degrees with the line of sight of eyes 14 when said eyes are viewing said port 22. By positioning said reflecting means 32 in this fashion, an individual looking into casing 10 sees the light indicium formed by port 22 and a second light indicium which is the image of said indicium. The spacing between said indicium and its image is determined by the distance between reflective means 32 and port 22. This distance may be changed by activating solenoid 34 as hereinafter described. The size of the light indicium from port 22 for any given light intensity is determined by the position of variable blade 36, which blade is positioned over a portion of port 22 to partially prevent light from passing therethrough. Said variable blade 36 is controlled with solenoid 38 as hereinafter described. In the preferred embodiment of my invention, the individual being tested does not look directly at the light indicium and its image, but instead, said individual sees said indicium and its image on a second reflective means, such as substantially plane mirror 40, which is positioned to redirect light emanated through port 22 to the center portion of casing 10 wherein it can be viewed by eyes 14. Said mirror 40 is preferably supported in its desired position with upper wall 42 of base 12.

The interior portion of my testing device is preferably maintained substantially black. Reflecting mirror 40 is used to further accomplish this result. In addition, the end of casing 10 is partially blocked with end plate 44 which is provided with port 46 proximate its center portion which enables an individual to peer therethrough into the interior of said casing. As shown in FIGURE 4, eyepiece 48 having an individual port for each eye of an individual to look therethrough is secured to end plate 44 over port 46. So that each eye may be individually tested, said eyepiece 48 is preferably provided with means such as slide plates 50 for separately covering each of the individual eye ports.

FIGURE 5 shows a perspective view of the preferred interior construction of my testing device. As shown, light source 18 is secured to bottom 20 of base 12 in a conventional fashion. Preferably, said source 18 is positioned between sidewalls 52 and 54, which walls are used to support intermediate plate 24 and to also confine light emitted by said source 18 within a small enclosed area. Diffusing member 30 is secured to said intermediate plate 24 on its bottom side so that it covers port 22. Variable blade 36, shown in detail in FIGURE 6, is positioned to cover a portion of said port 22 so as to prevent light from passing through its entire area. Blade 36 is slidably mounted on intermediate plate 24 and is held in coacting relationship with said port 22 by L-shaped members 56 which are positioned on either side of said blade in such a fashion so as to form keyways through which said blade 36 slides. The end of blade 36 which partially covers port 22 is preferably angled so as to form a sharp edge which defines one side of the light indicium which is seen through port 22. The opposite end of said blade 36 is secured to connecting plate 58 which plate in turn is secured to connecting rod 60. Said connecting rod 60 is activated with solenoid 38, e.g., when current is passed through solenoid 38 connecting rod 60 is urged to move in a direction so as to urge blade 36 to cover an increased portion of port 22. When said solenoid 38 is deactivated spring 62, connected between solenoid 38 and bracket 64 (which bracket is secured to connecting plate 58), urges said blade 36 to move back to its original position wherein an increased portion of port 22 is exposed. In a similar fashion, mirror 32 is secured to support plate 66. This may be done by gluing said mirror to said support plate in a conventional fashion. Support plate 66 is in turn secured to connecting rod 68 which is activated by solenoid 34. When said solenoid 34 is deactivated, mirror 32 is slid back to its original position by spring 70 which is connected between said solenoid 34 and mirror 32 in a conventional fashion.

FIGURE 7 shows a schematic wiring diagram of my invention. The basic electrical components of my testing device are light 18, which is preferably a source having a light intensity that remains constant for any constant voltage applied thereto such as a conventional iodine quartz electric bulb; potentiometer 72 for varying the voltage applied to said source 18; voltmeter 74 for indicating said voltage; solenoid 34, with controlling switch 76, for changing the relative position between the light indicium formed by aperture 22 and its image as seen on mirror 32; and solenoid 38, for varying the size of the light indicium as formed by aperture 22, with its controlling switch 78. In addition, in the preferred embodiment of my invention, on-off switch 80 is used for controlling current flow to each of the aforementioned control devices. To activate light source 18, on-off switch 80 is closed and current flows along lines 82 and 84 to said source 18. From thence, said current flows along line 86 and then through potentiometer 72, which is used to control the intensity of said light 18. Said intensity is preferably a direct function of the voltage applied thereto as previously indicated. This voltage is read directly from voltmeter 74 which is connected to potentiometer 72 with line 88. From said voltmeter 74, current flows back to its source along lines 90 and 92. Solenoids 34 and 38 are activated by merely closing switches 76 and 78 respectively. When said switch 76 is closed, current flows along line 82 to said solenoid 34 and from thence along line 94, through said closed switch 76, and back to its source along line 92. Similarly, when switch 78 is closed, current flows along lines 82 and 96 to said solenoid 38. From thence, said current flows along line 98, through closed switch 78, and along lines 100 and 92 back to its source.

In using the testing device of my invention, the individual to be tested is positioned to look directly into the interior of casing 10 through eyepiece 48. Light source 18 is activated by turning switch 80 to its on position. Potentiometer 72 is then adjusted so that the intensity of said light source 18 is relatively low. At this point, the individual being tested observes what appears to be two indicium. In the preferred embodiment of my invention the light indicium are observed on mirror 40 at points $x$ and $y$. The intensity of said light source 18 is then slowly increased by adjusting potentiometer 72 to increase the voltage applied to said light source. Said voltage is increased until the individual being tested indicates that the two observed indicium appear to have merged into a single indicium. When this occurs, the examiner notes the intensity of light source 18 by reading directly from voltmeter 74 the voltage which is applied to said source 18. The examiner then converts the voltage reading, which is equivalent to retinal irradiation, to lens tint or color through the use of an empirical chart of the type previously described. It is often desirable to run several tests on each individual and obtain average retinal irradiation reading.

It is also possible to test an individual with my device to determine whether they should use tinted lenses in spectacles which are used for inside light conditions as well as outside light conditions. In this test, solenoid 34 is activated by closing control switch 76. This urges mirror 34 to move to a position which is closer to port 22. Accordingly, when an individual being tested peers into casing 10 he once again observes two indicium. However, said indicium are substantially closer together when compared to the previous test. Once again the intensity of light source 18 is increased until the two indicium appear to merge into a single indicium. However, because of the closeness of the two indicium the intensity required to merge them is substantially less than that required when the indicium are further separated. If the voltage, i.e., the retinal irradiation, observed during the second test is greater than a predetermined amount, under light conditions of this type, the individual generally requires indoor tinted lenses. Another series of tests may be run in which the size of the light indicium is increased. This may be done by closing control switch 78 to thereby activate solenoid 38. By changing said size a second set of voltage readings may be obtained which may be converted to lense tint or color through the use of a second empirical chart of the type described.

It is to be noted that the phrase "light source," as used in the foregoing description and claims refers to any single source of light or plurality of said sources arranged in any configuration or relationship. The term "lenses" as used in the foregoing description and claims refers to any type of lens used by an individual in combination with his eyes such as corrective lenses, e.g., contact lenses, spectacles, etc., or sunglasses. The phrase "tinted lenses" as used in the foregoing description and the claims refers to any lenses that are colored or otherwise treated in any fashion to modify or control their light transmitting characteristics.

Whereas there is here illustrated and specifically described a certain preferred construction and method which is presently regarded as the best mode of carrying out the invention, it should be understood that various changes may be made and other steps adopted without departing from the inventive subject matter particularly pointed out and claimed.

I claim:

1. A retinal irradiation measuring device which comprises a casing having an opening into which an individual may look; light source means positioned in said casing for producing light, means connected to said light source means for varying the quantity of light produced by said source; barrier means positioned within said casing between said light source and said opening for blocking light produced by said light source; indicium means in said barrier means illuminated by said light source; and reflecting means positioned in said casing for providing a reflected image of said indicium means in a side by side relationship with said indicium means wherein an individual looking through said opening in said casing sees said indicium means and said reflected image of said indicium means in said side by side relationship.

2. The retinal irradiation measuring device of claim 1 wherein said reflecting means is a substantially plane mirror.

3. The retinal irradiation measuring device of claim 2 wherein said mirror is adjustably mounted within said casing and is provided with means for varying the distance between said indicium and said mirror.

4. The retinal irradiation measuring device of claim 6 wherein means are provided in combination with said elongated slot for varying the width of said slot.

5. The retinal irradiation measuring device of claim 2 wherein voltage indicator means are connected to said light source means for indicating the voltage applied to said light source.

6. The retinal irradiation measuring device of claim 5 wherein said light source means has a substantially constant light intensity for a predetermined voltage applied to said source.

7. The retinal irradiation measuring device of claim 2 wherein a light diffusing translucent plate is positioned between said light source means and said indicium in said barrier.

8. The retinal irradiation measuring device of claim 7 wherein second reflecting means are provided in said casing between said opening in said casing and said barrier for enabling an individual to look into said casing and see said illuminated indicium and said image of said illuminated indicium on said second reflecting means.

9. The retinal irradiation measuring device of claim 2 wherein said barrier contains an indicium in the form of an elongated slot.

References Cited

UNITED STATES PATENTS

| 1,563,172 | 11/1925 | De Zeng | 351—6 |
| 2,036,181 | 3/1936 | Mendelsohn et al. | 351—17 |
| 2,081,969 | 6/1937 | Allen et al. | 351—13 |
| 2,234,240 | 3/1941 | Frohring et al. | 351—36 |

OTHER REFERENCES

Sears and Zemansky, University Physics, 3rd ed. (1964), pp. 2 and 3.

DAVID SCHONBERG, *Primary Examiner.*

PAUL A. SACHER, *Assistant Examiner.*

U.S. Cl. X.R.

351—36